Patented May 1, 1934

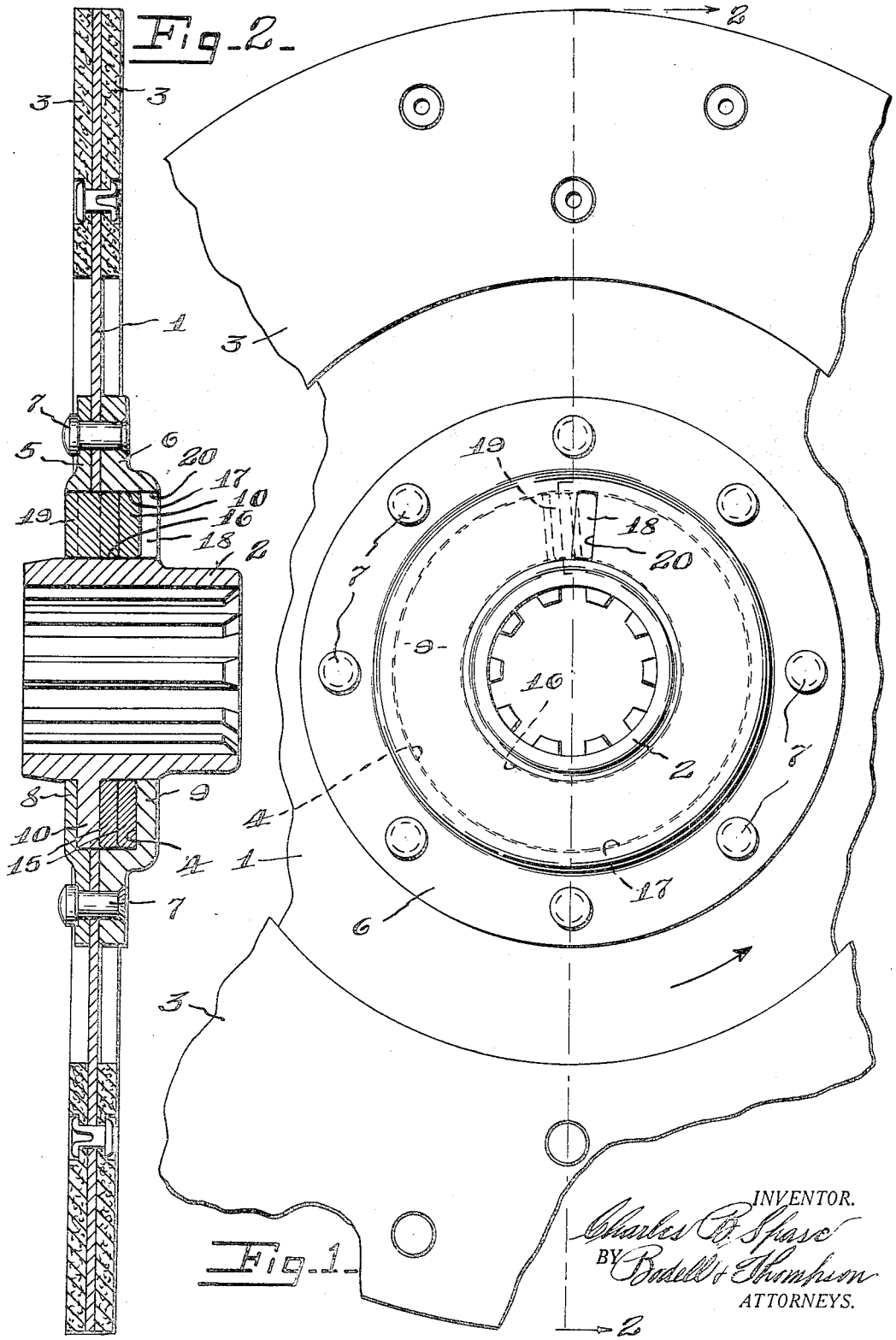

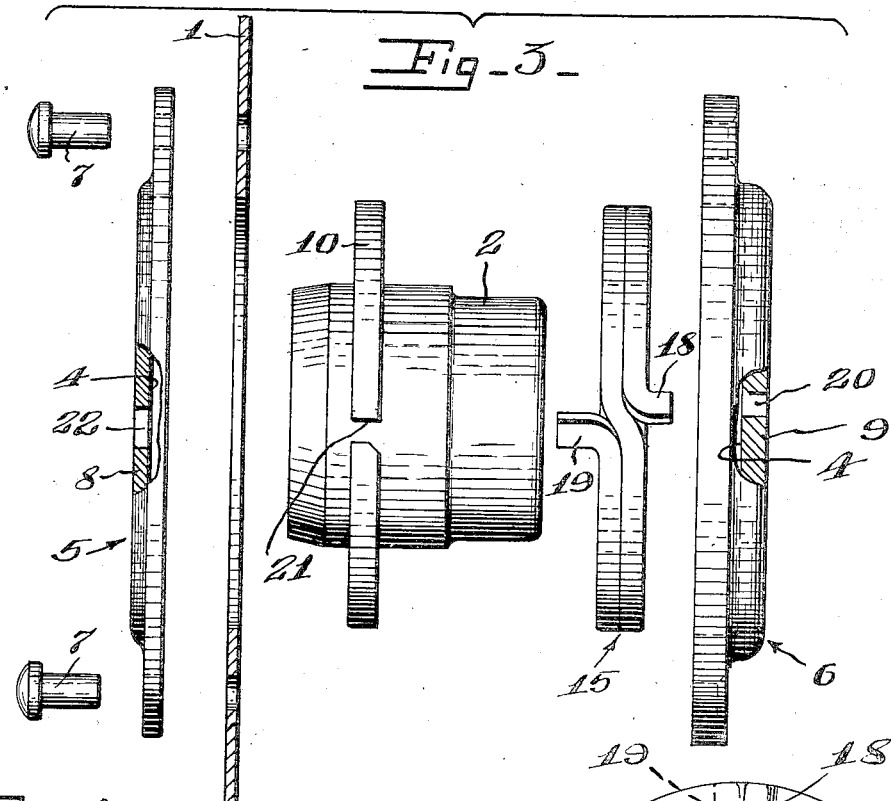
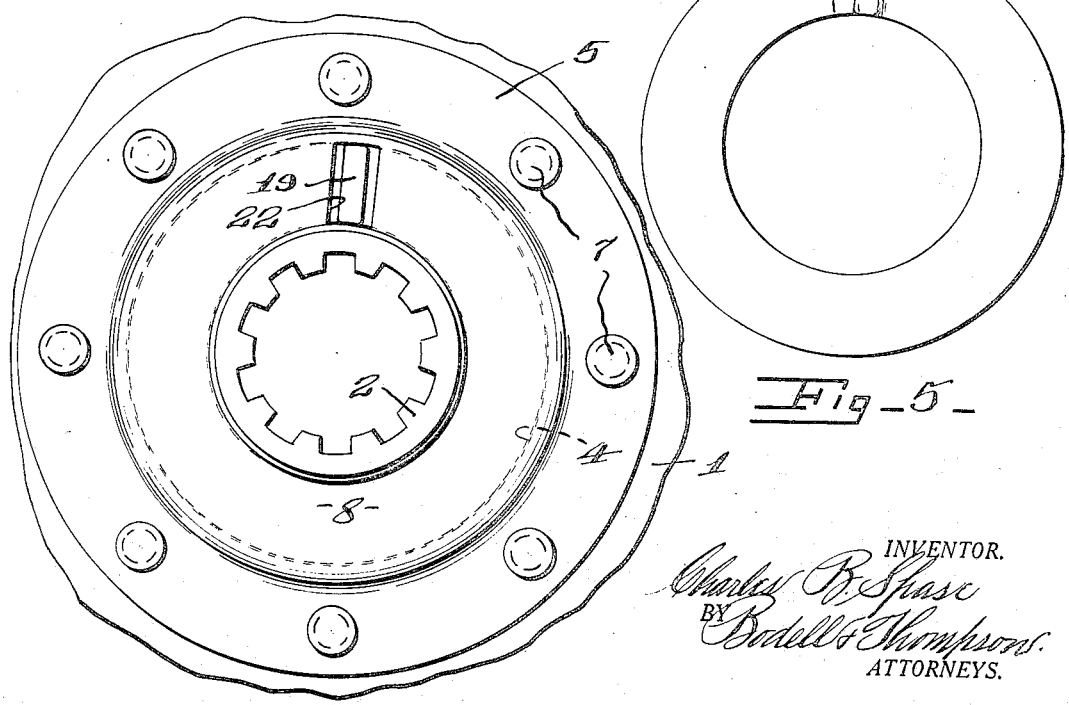

1,957,114

UNITED STATES PATENT OFFICE 1,957,114

VIBRATION DAMPENER MOTION TRANSMITTING ELEMENT

Charles B. Spase, Nedrow, N. Y., assignor to W. C. Lipe Inc., Syracuse, N. Y., a corporation of New York Application February 24, 1932, Serial No. 594,881

3 Claims. (Cl. 64—100)

This invention relates to motion transmitting elements, as for instance, the disk or plate of friction clutches, such as are used in motor vehicles and has for its object a particularly simple, economical and compact two-way vibration dampening clutch means built in the motion transmitting or clutch element.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation of a clutch element embodying this invention.

Figure 2 is a sectional view on line 2—2, Figure 1.

Figure 3 is an exploded view of the parts of the clutch element.

Figure 4 is a fragmentary opposite side elevation from that seen in Figure 1.

Figure 5 is a face view of the coiled clutch means between the driving and driven members of the clutch element.

This motion transmitting element includes driving and driven members, a two-way friction clutch means between said members and connections between the clutch means and said members whereby the clutch means is operable by the driving force to frictionally clutch the two members together and releasable by the discontinuance of the driving force, and by a back or reverse driving force from the driven member to the driving member to momentarily release the clutch from both members and thus relieve any vibration originating in one member from being transferred to the other before again clutching the members together. The clutch means acts to relieve the driven member of shocks during starting and quick accelerating while the clutch means is being tightened into frictional engagement, the frictional engagement increasing in proportion to the increase in the driving force.

I have here illustrated my invention as embodied in the so-called single plate of a friction clutch. This plate, as here shown, includes a driving member 1, a driven member 2, and friction clutch means between said members. The driving member 1 is provided with friction rings 3 on opposite sides of its margins for coacting with the other parts of the clutch of a motor vehicle, as the recess in the fly wheel of the engine and the pressure ring operated by the clutch spring and the throw-out mechanism not shown. The member 1 is also provided with a hub formed with an internal annular recess 4, the hub consisting of rings 5, 6, clamped on opposite sides of the inner margin of the disk 1, as by rivets 7, these rings 5 having annular flanges 8, 9, forming the opposite walls of the recess 4.

The inner member 2 is a sleeve splined on the driven shaft of the clutch, not shown, the member 2 extending through the driving member 1 on opposite sides thereof, the sleeve 2 having a peripheral shoulder, usually an annular flange 10, extending into the recess 4 adjacent one of the walls thereof, as the wall 8. Hence, the members 1 and 2 are outer and inner members concentrically arranged.

The friction clutch means between said members is here illustrated as contractile and expansible and when contracted frictionally engaging the inner member 2 to transmit the torque from the driving member to the driven member, and being capable of expanding out of frictional engagement with the inner member 2 and into engagement with the outer member 1, when the back driving force becomes greater than the driving force on the member 1, so that while so expanding the members 1 and 2 are momentarily free of each other, thus relieving the member 1 of any vibration or shock that would otherwise occur. Also, while driving force greater than the load on the inner member 2 is being applied to the driving member 1, the clutch member is being contracted on the driven member 2 into frictional engagement therewith in accordance with the amount of driving force. Hence, shocks due to sudden starting or acceleration of the member 1 are dampened by the clutch means while the clutch means is contracting. The clutch member is connected to both driving and driven members by means, or in such a manner as to prevent a sudden grabbing of the clutch means when the driving or accelerating force is applied to the member 1 and to momentarily release and prevent a sudden grabbing of the clutch means when the load or back driving force on the member 2 is greater than the driving force on the member 1.

The clutch means shown in Figures 1, 2 and 3, is a cylindrically or helically coiled element or spring 15, the coils being oblong in cross section with substantially flat faces, and arranged with the long diameter of the oblong formation radial to the axis of the coil so that the coils are in the nature of flat rings or disks. The coil is arranged in the recess 4 with normally slight clearances at 16 and 17 between the inner edges of the coils and the periphery of the hub 2 and between the outer edges of the coil and the inner cylindrical wall of the recess 4.

The means connecting the ends of the coil to the members 1 and 2 are shown as annular lugs 18 and 19 at opposite ends of the coil, one lug, as 18, interlocking with the member 1, and the other lug, as 19, interlocking with the member 2. As here shown, the lug 18 extends into and slidably fits, without lost motion, a slot 20 in the ring 6 and the lug 19 extends into and slidably fits, without lost motion, a slot 21 in the annular flange 10. The lug 19 also preferably extends into a slot 22 formed in the ring 5, the slot 22 being wider than the lug 19 in order to permit the coil to expand and contract or so that the coil is not anchored at both ends to the member 1 and also so that the lug 19 will act as a key to hold the members 1, 2 in driving relation in case the coil breaks.

In operation, the driving force applied to the member 1 in the direction of the arrow, Figure 1, first is transferred to the clutch or coil 15 through the lug 18, owing to the fact that this lug 18 substantially fits the slot 20 and to the fact that the slot 22 is wider than the lug 19, thus applying torque to the clutch coil 15 tending to contract it on the member 2 so that the only force borne by the lug 18 and lug 19 by reason of their being interlocked respectively with the ring 6 and annular flange 10, is that required to constrict the coil onto the hub 2 taking up the normal clearance, as at 16. The amount of constriction is in proportion to the driving force applied and hence shocks or vibrations due to starting or sudden acceleration of the member 1 are absorbed or dampened by the coil 15, while contracting or constricting. When a back driving force in the direction of the arrow, Figure 1, is applied to the member 2, as when the vehicle is traveling or coasting faster than the engine connected to the member 1 is driving, torque is applied to the clutch coil 15 in the opposite direction, first tending to expand the coil 15 out of engagement with the member 2 forming the clearance at 16 and then taking up the clearance at 17 and clutching the coil 15 to the outer member 1, so that the shock or vibration caused by the acceleration of the member 2 relatively to the member 1 is not transmitted to the member 1, due to the fact that the coil 15 is momentarily released from transmitting force while expanding. After releasing, if greater back drive continues, the motion is transmitted to the member 1 through the frictional engagement of the coil with the cylindrical wall of the recess 4. Thus, sudden acceleration of either the member 1 or the member 2 due to a greater back driving force is dampened or absorbed before the members 1 and 2 are clutched together by the contracting or expanding action of the coil 15.

In any form of the invention, driving force, when applied to members 1 or 2, clutches the members together by operating a two-way clutch means, whether a band or coil, and each member 1 or 2 is relieved of the torque vibration of the other so that the vibrations are dampened and the vibration lines on a graph or chart are made up of small or low regular waves instead of irregular waves, some high and others low.

What I claim is:—

1. A motion transmitting element comprising inner and outer members, the outer member being formed with a hub around the inner member, and the inner member having a peripheral shoulder extending into the bore of said hub, an expansible and contractile coiled vibration dampening part surrounding the inner member within the bore of the outer member and operable to constrict onto the inner member, and to expand against the inner wall of the hub of the outer member, said part being secured at its opposite ends to said shoulder and to the hub respectively and the end thereof which is secured to the shoulder being also connected to the hub by a lost motion connection.

2. A motion transmitting member comprising inner and outer members, the outer member having a hub formed with an internal annular chamber, and end walls for said chamber, the inner member extending through the hub and having an annular flange extending into the internal chamber, the flange being formed with a transverse opening and also the end walls of the chamber being formed with transverse openings, the flange being located adjacent one of the end walls of the chamber, and the openings in the flange and the adjacent end wall being arranged in alinement and the opening in the adjacent end wall being of greater width than the opening in the flange, an expansible and contractile clutch in said chamber and arranged to contract on the inner member and expand against the outer wall of the chamber, said part having angularly extending shoulders at its ends, the shoulder at one end extending through said alined openings, and the shoulder at the other end extending into the remaining opening, whereby the clutch member is anchored at its opposite ends to the flange of the inner member and to the remote side wall of the chamber of the outer member and is also connected by a lost motion connection to the outer member.

3. A motion transmitting element comprising inner and outer members, the outer member being formed with a hub around the inner member, and the inner member having a peripheral shoulder extending into the bore of said hub, an expansible and contractile vibration dampener part extending around the inner member within the bore of the outer member and operable to contract on the inner member and to expand against the inner wall of the hub of the outer member, said part being secured at its opposite end to said shoulder and to the hub respectively, and the end thereof, which is secured to the shoulder, being connected to the hub by a lost motion connection.

CHARLES B. SPASE.